United States Patent [19]

Murata et al.

[11] Patent Number: 5,597,876
[45] Date of Patent: Jan. 28, 1997

[54] EPOXY RESIN COMPOSITION CONTAINING NOVOLAC WITH ADJACENT HYDROXYL GROUPS

[75] Inventors: Yasuyuki Murata; Yoshinori Nakanishi, both of Yokkaichi; Mitsukazu Ochi, Suita, all of Japan

[73] Assignee: Shell Oil Company, Houston, Tex.

[21] Appl. No.: 625,839

[22] Filed: Apr. 1, 1996

Related U.S. Application Data

[63] Continuation of Ser. No. 301,219, Sep. 6, 1994, abandoned.

[30] Foreign Application Priority Data

Sep. 24, 1993 [JP] Japan ................................ 5-258967

[51] Int. Cl.⁶ ........................ C08G 59/24; C08L 63/00
[52] U.S. Cl. ........................ 525/481; 525/534; 528/97; 523/443; 523/466
[58] Field of Search ........................ 525/481, 534; 528/97; 523/443, 466

[56] References Cited

U.S. PATENT DOCUMENTS

| | | | |
|---|---|---|---|
| 4,340,716 | 7/1982 | Hata et al. | 528/104 |
| 5,141,974 | 8/1992 | Konishi et al. | 525/481 |
| 5,149,730 | 9/1992 | Murata et al. | |
| 5,334,674 | 8/1994 | Naka et al. | 525/481 |

FOREIGN PATENT DOCUMENTS

| | | |
|---|---|---|
| 0403022A2 | 12/1990 | European Pat. Off. |
| 0553371A1 | 8/1993 | European Pat. Off. |
| 4135533A1 | 10/1991 | Germany . |
| 62-167318 | 7/1987 | Japan . |
| 63-251419 | 10/1988 | Japan . |
| 1043521A | 2/1989 | Japan . |
| 04199856A | 7/1992 | Japan . |
| 05311048A | 11/1993 | Japan . |
| 2207675 | 2/1989 | United Kingdom . |

OTHER PUBLICATIONS

"Effect of Network Structure on Thermal and Mechanical Properties of Cured Epoxide Resins," by T. Shiraishi, H. Motobe, M. Ochi, Y. Nakanishi, and I. Knoishi, Polymer, 1992, vol. 33, No. 14, pp. 2975–2980.

Primary Examiner—Frederick Krass

[57] ABSTRACT

An epoxy resin composition is provided comprising a biphenol-type epoxy resin and a polyhydric phenol resin curing agent derived from a polyhydric phenol compound having 2 or more phenolic hydroxyl groups attached at adjacent positions on the aromatic ring. A cured product with excellent stability and strength at high temperatures can be obtained useful as adhesives, castings, sealing materials, moldings, and laminates.

14 Claims, No Drawings

EPOXY RESIN COMPOSITION CONTAINING NOVOLAC WITH ADJACENT HYDROXYL GROUPS

This is a continuation of application Ser. No. 08/301,219, filed Sep. 6, 1994, now abandoned.

FIELD OF INVENTION

The invention relates to an epoxy resin composition which when cured has high heat resistance.

BACKGROUND OF THE INVENTION

In recent years, polymeric materials have been increasingly used in wider applications. Demand for better heat resistant properties of these polymeric materials have increased accordingly. In some uses, polymeric materials are exposed to high temperatures, causing them to soften and lose their strength, and decompose and deteriorate, producing such a problem that they cannot be used for long periods of time.

Epoxy resin compositions are used in various fields, including laminating, coating, adhesion, sealing, molding, and the like. But, for the reasons mentioned above, epoxy resin compositions containing bisphenol A-type epoxy resins, which are in wide use today, have become insufficient in providing the properties in demand.

In order to improve heat resistance, polyfunctional-type epoxy resins, such as novolak-type epoxy resins, trifunctional-type epoxy resins, and tetrafunctional-type epoxy resins have been used. But, these polyfunctional-type epoxy resins and their cured products do not have sufficient strength at high temperatures, and are rigid and brittle.

It is proposed in *Polymer*, Vol. 33, p. 2975 (1992) that when biphenol-type epoxy resins are cured with diaminodiphenylmethane, they have excellent mechanical properties at high temperatures; however, products obtained by curing with amine-type curing agents are known to have inferior thermal stability.

Products obtained by curing with phenolic curing agents are known to have excellent thermal stability. But, in the case of biphenol-type epoxy resins even when they are cured using common phenolic curing agents such as phenolnovolak there is room to improve the mechanical properties of the cured product at high temperatures.

Therefor it is an object of the present invention to provide an epoxy resin composition which when cured has high heat resistance, i.e., has excellent stability and strength at high temperatures.

SUMMARY OF THE INVENTION

Accordingly an epoxy resin composition is provided, comprising (a) a biphenol-type epoxy resin and (b) a polyhydric phenol resin curing agent derived from a polyhydric phenol compound having 2 or more phenolic hydroxyl groups attached at adjacent positions on the aromatic ring.

DETAILED DESCRIPTION OF THE INVENTION

The epoxy resin composition according to the present invention is a composition comprising: (a) a biphenol-type epoxy resin represented by the following general formula (I):

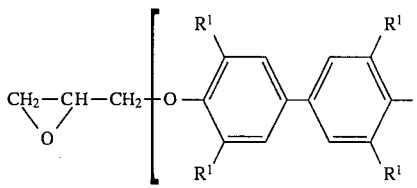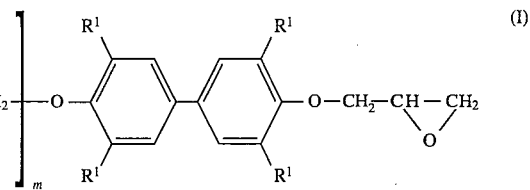

wherein $R^1$ is a hydrogen atom, a halogen atom, an alkyl group of 1–10 carbon atoms, a substituted or unsubstituted phenyl group, a substituted or unsubstituted aralkyl group or an alkoxy group, each $R^1$ being the same or different, and m is a number with an average value of 0–5; and (b) a polyhydric phenol resin curing agent derived from a polyhydric phenol compound having 2 or more phenolic hydroxyl groups attached at adjacent positions on the aromatic ring. As will be appreciated by the skilled artisan, the term "substituted" encompasses those substituents known in the art to be non-interfering with the curing reaction between the epoxy resin and the phenol resin curing agent.

The biphenol-type epoxy resin component (a) represented by the above general formula (I), to be used in the epoxy resin composition according to the present invention, is an epoxy resin obtained by a condensation reaction of any biphenol with epichlorohydrin in the presence of an alkali.

The biphenol to be used as a starting material for the production of the biphenol-type epoxy resin may be, for example, 4,4'-biphenol, 3,3'-dimethyl-4,4-biphenol, 3,5'-dimethyl-4,4'-biphenol, 3,3'-dibutyl-4,4'-biphenol, 3,5-dibutyl-4,4'-biphenol, 3,3'-diphenyl-4,4'-biphenol, 3,3'-dibromo-4,4'-biphenol, 3,3',5,5'-tetramethyl -4,4'-biphenol, 3,3'-dimethyl-5,5'-dibutyl-4,4'-biphenol, 3,3',5,5'-tetrabutyl-4,4'-biphenol, 3,3',5,5'-tetrabromo-4,4'-biphenol, or the like.

By reacting one or a mixture of 2 or more of these biphenols with epichlorohydrin by a conventional method, a biphenol-type epoxy resin component (a) may be obtained for use according to the present invention.

Furthermore, an epoxy resin derived from 3,3',5,5'-tetramethyl-4,4'-biphenol and a mixture of an epoxy resin derived from 3,3',5,5'-tetramethyl-4,4'-biphenol and an epoxy resin derived from 4,4'-biphenol are commercially available from Yuka Shell Epoxy Co. as "EPIKOTE YX4000" (trade name) and "EPIKOTE YL6121" (trade name), respectively, and therefore these products may be used to prepare an epoxy resin composition according to the present invention.

Subsequently, the polyhydric phenol resin curing agent component (b) which is incorporated in the epoxy resin composition according to the present invention as one of its essential components, is a polyhydric phenol resin derived from a polyhydric phenol compound which has 2 or more phenolic hydroxyl groups attached at adjacent positions on the aromatic ring.

As polyhydric phenol compounds having 2 or more phenolic hydroxyl groups attached at adjacent positions on their aromatic rings may be mentioned compounds represented by the following general formulas (III), (IV), (V) and (VI).

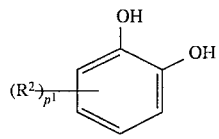 (III)

wherein $R^2$ is an alkyl group of 1–10 carbon atoms, a substituted or unsubstituted phenyl group, a substituted or unsubstituted aralkyl group, an alkoxy group, a hydroxy group or a halogen atom, each $R^2$ being the same or different, and $p^1$ is an integer of 0–2.

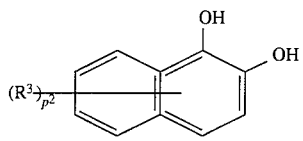 (IV)

wherein $R^3$ is an alkyl group of 1–10 carbon atoms, a substituted or unsubstituted phenyl group, a substituted or unsubstituted aralkyl group, an alkoxy group, a hydroxyl group or a halogen atom, each $R^3$ being the same or different, and p2 is an integer of 0–4.

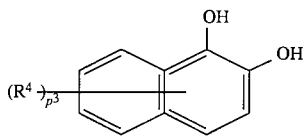 (V)

wherein $R^4$ is an alkyl group of 1–10 carbon atoms, a substituted or unsubstituted phenyl group, a substituted or unsubstituted aralkyl group, an alkoxy group, a hydroxyl group or a halogen atom, each $R^4$ being the same or different, and $p^3$ is an integer of 0–4.

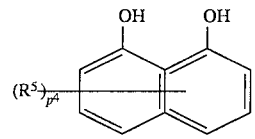 (VI)

wherein $R^5$ is an alkyl group of 1–10 carbon atoms, a substituted or unsubstituted phenyl group, a substituted or unsubstituted aralkyl group, an alkoxy group, a hydroxyl group or a halogen atom, each $R^5$ being the same or different, and $p^4$ is an integer of 0–4.

As embodiments of such compounds having 2 or more phenolic hydroxyl groups attached at adjacent positions on their aromatic rings may be mentioned, for example, catechol, methylcatechol, dimethylcatechol, butylcatechol, phenylcatechol, methoxycatechol, pyrogallol, hydroxyhydroquinone, tetrahydroxybenzene, bromocatechol, 1,2-dihydroxynaphthalene, methyl-1,2-dihydroxynaphthalene, dimethyl-1,2-dihydroxynaphthalene, butyl-1,2-dihydroxynaphthalene, methoxy-1,2-dihydroxynaphthalene, hydroxy-1,2-dihydroxynaphthalene, dihydroxy-1,2-dihydroxynaphthalene, bromo-1,2-dihydroxynaphthalene, 2,3-dihydroxynaphthalene, methyl-2,3-dihydroxynaphthalene, dimethyl-2,3-dihydroxynaphthalene, butyl-2,3-dihydroxynaphthalene, methoxy-2,3-dihydroxynaphthalene, hydroxy-2,3-dihydroxynaphthalene, dihydroxy-2,3-dihydroxynaphthalene, bromo-2,3-dihydroxynaphthalene, 1,8-dihydroxynaphthalene, methyl-1,8-dihydroxynaphthalene, dimethyl-1,8-dihydroxynaphthalene, butyl-1,8-dihydroxynaphthalene, methoxy-1,8-dihydroxynaphthalene, hydroxy-1,8-dihydroxynaphthalene, dihydroxy-1,8-dihydroxy, bromo-1,8-dihydroxynaphthalene, etc.

The polyhydric phenol resin component (b) to be used as the curing agent in the epoxy resin composition according to the present invention is a polyhydric phenol resin derived from a polyhydric phenol compound which has 2 or more phenolic hydroxyl groups attached at adjacent positions on the aromatic ring, as described above, but there are no particular restrictions on the method for the preparation of the polyhydric phenol resin. Generally, the preparation method involves oligomerization to a resin of the above mentioned polyhydric phenol compound which has 2 or more phenolic hydroxyl groups attached at adjacent positions on the aromatic ring, via an addition-condensation reaction with a compound having a carbonyl group, an addition reaction with a compound having an unsaturated bond, or a condensation reaction with an α-hydroxyalkylbenzene or α-alkoxyalkylbenzene, etc.

The compound having a carbonyl group may be any type of aldehyde or ketone, and embodiments thereof include, for example, formaldehyde, paraformaldehyde, acetaldehyde, benzaldehyde, hydroxybenzaldehyde, glyoxal, terephthalaldehyde, acetone, cyclohexanone, acetophenone, and the like.

Also, the compound having an unsaturated bond may be, for example, divinylbenzene, diisopropenylbenzene, diisopropenylnaphthalene, dicyclopentadiene, norbornene, a terpene, or the like.

As compounds having both a carbonyl group and an unsaturated bond may be mentioned, for example, crotonaldehyde, isopropenylacetophenone, etc.

In addition, α-hydroxyalkylbenzenes, and α-alkoxyalkylbenzenes, include, for example, α,α'-dihydroxylene, α,α'-dimethoxyxylene, dihydroxymethylphenol, trihydroxymethylbenzene, trihydroxymethylphenol, dihydroxymethylcresol, tetrahydroxymethylbisphenol A, and the like.

The reaction of the polyhydric phenol compound which has 2 or more phenolic hydroxyl groups attached at adjacent positions on the aromatic ring with a compound having a carbonyl group, a compound having an unsaturated bond, or an α-hydroxyalkylbenzene or α-alkoxyalkylbenzene for oligomerization to form a resin, may be any reaction methods which are commonly used. That is, the reaction may be carded out in the presence of an acid catalyst, at a temperature within the range of from about 20° to about 200° C., for a period of time of about 1 to about 20 hours.

In addition to the polyhydric phenol compound which has 2 or more phenolic hydroxyl groups attached at adjacent positions on the aromatic ring, another phenol can be used in combination therewith, depending on the case. The amount of the additional phenols to be used in combination is preferably about 50 weight percent or less based on the total mixture containing the phenols. If the amount of the additional phenols is too large, then the effect according to the present invention will not be sufficiently exhibited.

A larger proportion of the compound having a carbonyl group, the compound having an unsaturated bond, or the α-hydroxyalkylbenzene or α-alkoxyalkylbenzene based on the total amount of phenol compounds used in the reaction will result in a larger molecule of the resulting polyhydric phenol resin and thus improved heat resistance. But since the viscosity increases thereby making its handling difficult during processing, it is necessary to adjust their proportions in accordance with the purpose of use. Normally, the amount of the compound having a carbonyl group, the compound having an unsaturated bond, or the α-hydroxyalkylbenzene or α-alkoxyalkylbenzene to be used is from about 0.1 to about 1.0 moles, and preferably from about 0.2 to about 0.8 moles, with respect to 1 mole of the total amount of phenol compounds.

As the acidic catalyst may be used, for example, hydrochloric acid, sulfuric acid, oxalic acid, toluenesulfonic acid, organic acid salts which exhibit acidity, fluoroboric acid, heteropoly acids, activated clay, and the like can be listed. The amount of the acidic catalyst to be used is typically from about 0.1 to about 5 parts by weight to 100 parts by weight of the total amount of phenol compounds.

For the reaction, an inert solvent such as, for example, an aromatic hydrocarbon, alcohol, ether or the like may be used, and further a ketone solvent may be used by selecting the conditions of the condensation reaction, such as the catalyst, etc.

If the polyhydric phenol resin curing agent is produced by, for example, a reaction between catechol and formaldehyde, then a polyhydric phenol resin represented by the following structural formula (XI) will result.

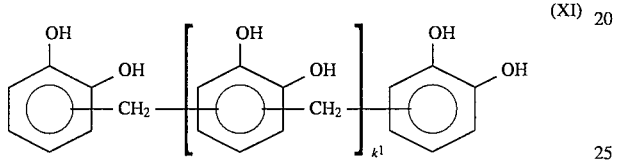

(XI)

wherein $k^1$ is a number with an average value of 0–10.

If it is produced by, for example, a reaction between 1,2-dihydroxynaphthalene and α,α'-dihydroxyxylene, then a polyhydric phenol resin represented by the following structural formula (XII) will result.

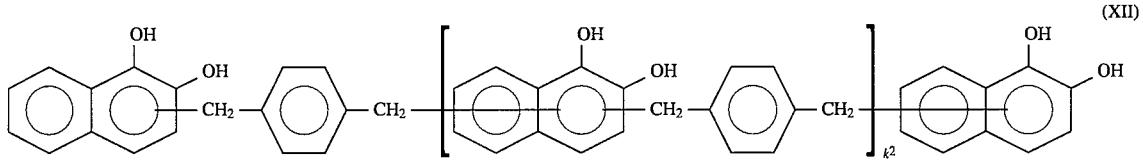

(XII)

wherein $k^2$ is a number with an average value of 0–10.

Furthermore, generally speaking, of the polyhydric phenol resins to be produced by the above-mentioned variety of methods, a polyhydric phenol resin which is particularly suited for the polyhydric phenol resin curing agent component (b) according to the present invention are those represented by the following general formula (II):

$$A-Y+A-Y\mathord{\mathchoice{}{}{}{}}_{\!n}A \qquad (II)$$

In the above general formula (II), A is a monovalent or divalent residual group derived from a polyhydric phenol compound represented by the following general formula (III), (IV), (V), or (VI), and each A may be the same or different; Y is a divalent residual group represented by the following general formula (VII), (VIII), (IX), or (X), and each Y may be the same or different; and n is a number with an average value of 0–10.

The polyhydric phenol compound is represented by the following formulas:

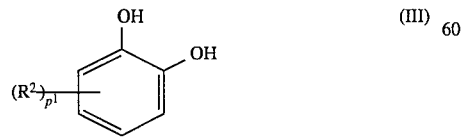

(III)

wherein $R^2$ is independently an alkyl group of 1–10 carbon atoms, a substituted or unsubstituted phenyl group, a substituted or unsubstituted aralkyl group, an alkoxy group, a hydroxyl group or a halogen atom, and $p^1$ is an integer of 0–2;

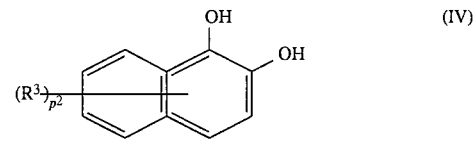

(IV)

wherein $R^3$ is independently an alkyl group of 1–10 carbon atoms, a substituted or unsubstituted phenyl group, a substituted or unsubstituted aralkyl group, an alkoxy group, a hydroxyl group or a halogen atom, and $p^2$ is an integer of 0–4;

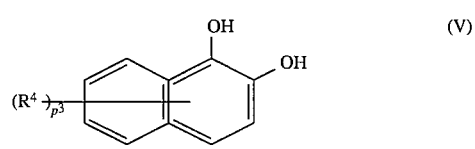

(V)

wherein $R^4$ independently is an alkyl group of 1–10 carbon atoms, a substituted or unsubstituted phenyl group, a substituted or unsubstituted aralkyl group, an alkoxy group, a hydroxyl group or a halogen atom, and $p^3$ is an integer of 0–4; or

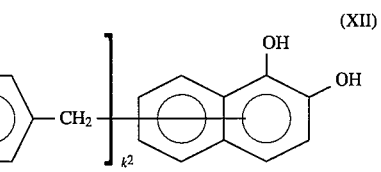

(VI)

wherein $R^5$ independently is an alkyl group of 1–10 carbon atoms, a substituted or unsubstituted phenyl group, a substituted or unsubstituted aralkyl group, an alkoxy group, a hydroxyl group or a halogen atom, and $p^4$ is an integer of 0–4.

Each Y is independently represented by the following general formulas (VII), (VIII), (IX) or (X):

(VII)

wherein $R^6$ is a hydrogen atom, an alkyl group of 1–10 carbon atoms, a substituted or unsubstituted phenyl group, a substituted or unsubstituted aralkyl group, an alkoxy group, a hydroxyl group or a halogen atom, each $R^6$ being the same or different;

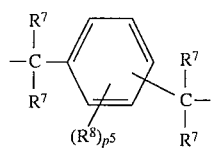

(VIII)

wherein $R^7$ and $R^8$ are each a hydrogen atom, an alkyl group of 1–10 carbon atoms, a substituted or unsubstituted phenyl group, a substituted or unsubstituted aralkyl group, an alkoxy group, a hydroxyl group or a halogen atom, $R^7$ and $R^8$ being either identical to each other or different, and $p^5$ is an integer of 0–4;

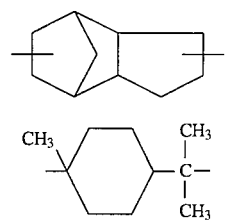

(IX)

(X)

According to the present invention, a polyhydric phenol resin curing agent derived from a polyhydric phenol compound having 2 or more phenolic hydroxyl groups attached at adjacent positions on the aromatic ring is used as component (b). If a polyhydric phenol resin curing agent derived from a polyhydric phenol compound with only 1 phenolic hydroxyl group on each aromatic ting is used, to obtain a cured product with sufficient strength at high temperatures can not be obtained. In addition, if a polyhydric phenol resin curing agent derived from a polyhydric phenol compound having 2 phenolic hydroxyl groups attached at nonadjacent positions on the aromatic ring is used, a cured product with sufficient strength at high temperatures can not be obtained.

The epoxy resin composition according to the present invention is a composition comprising (a) a biphenol-type epoxy resin and (b) a polyhydric phenol resin curing agent derived from a polyhydric phenol compound having 2 or more phenolic hydroxyl groups attached at adjacent positions on the aromatic ring, as described above in detail. Epoxy resins other than biphenol-type epoxy resins may also be used in admixture with this epoxy resin composition.

The other epoxy resins which may be used in admixture include, for example, epoxy resins produced from epichlorohydrin and various phenols or various phenolic compounds such as polyhydric phenol resins obtained by condensation reactions of various phenols with various aldehydes such as hydroxybenzaldehyde, crotonaldehyde, glyoxal, and the like, including bisphenol A, bisphenol F, bisphenol AD, hydroquinone, resorcin, methylresorcin, dihydroxynaphthalene, phenol novolak resin, cresol novolak resin, bisphenol A novolak resin, dicyclopentadiene phenol resin, terpene phenol resin, phenolaralkyl resin, naphthol novolak resin, and the like; epoxy resins produced from epichlorohydrin and various amine compounds such as diaminodiphenylmethane, aminophenol, xylenediamine, and the like; and epoxy resins produced from epichlorohydrin and various carboxylic acids such as methylhexahydroxyphthalic acid, dimer acid, and the like.

The proportion of these epoxy resins other than the biphenol-type epoxy resin to be used is preferably 200 parts by weight or less to 100 parts by weight of the biphenol-type epoxy resin (a). If the epoxy resins other than the biphenol-type epoxy resin are used in too large of a proportion, then the effect according to the present invention will not be sufficiently exhibited.

Also, the epoxy resin composition according to the present invention may contain additional epoxy resin curing agents in admixture with the polyhydric phenol resin curing agent derived from a polyhydric phenol compound having 2 or more phenolic hydroxyl groups attached at adjacent positions on the aromatic ting. The other curing agents which may be used in admixture include, for example, various phenol resins including phenol novolak resin, cresol novolak resin, bisphenol A novolak resin, dicyclopentadiene phenol resin, phenolaralkyl resin, terpene phenol resin, and the like, or various other phenol resins such as polyhydric phenol resins obtained by reactions of various phenols, with various aldehydes such as hydroxybenzaldehyde, crotonaldehyde, glyoxal, and the like; acid anhydrides such as methyltetrahydrophthalic anhydride, hexahydrophthalic anhydride, pyromellitic anhydride, methyl nadic anhydride, and the like; and amines such as diethylenetriamine, isopholonediamine, diaminodiphenylmethane, diaminodiphenylsulfone, and the like.

These other epoxy resin curing agents are preferably used at a proportion of 200 parts by weight or less to 100 parts of the polyhydric phenol resin curing agent derived from a polyhydric phenol compound having 2 or more phenolic hydroxyl groups attached at adjacent positions on the aromatic ring. If other epoxy resin curing agents are used in too large of a proportion, then the effect according to the present invention will not be sufficiently exhibited.

The epoxy resin composition according to the present invention may also contain various additives, similar to other conventional epoxy resin compositions. Such additives include, for example, curing accelerators, fillers, coupling agents, flame retardants, plasticizers, solvents, reactive diluents, pigments, and the like, and they may be incorporated in the composition as appropriate, depending on the need.

The curing accelerator can be, for example, an imidazole such as 2-methylimidazole, 2-ethyl-4-methylimidazole, and the like; an amine such as 2,4,6-tris(dimethylaminomethyl) phenol, benzyldimethylamine, and the like; or an organic phosphoric compound such as tributylphosphine, triphenylphosphine, tris(dimethoxyphenyl)phosphine, and the like.

The filler may be, for example, fused silica, crystalline silica, glass powder, alumina, calcium carbonate, or the like. Also, the flame retardant may be, for example, antimony trioxide, phosphoric acid, or the like, or flame retardation may be achieved by brominating a portion of the epoxy resin.

The epoxy resin composition according to the present invention produces a highly heat-resistant cured product, that is, a cured product with excellent stability and strength at high temperatures, and therefore is effective for such uses as adhesion, casting, sealing, molding, laminating, etc. Specifically, the curable epoxy resin composition will exhibit a cured flexural strength at 200 degrees celsius of at least 3.0 kg/cm$^2$ and a thermal stability of at least 390 degrees celsius.

EXAMPLES

A more detailed non-limiting description is provided below with reference to the Preparations, Examples, and Comparisons for the polyhydric phenol resin curing agents.

PREPARATION 1

Polyhydric Phenol Resin Curing Agent

Into a 1000 ml three-necked flask equipped with a thermometer, stirring apparatus and cooling tube were charged 330 g of catechol, 300 g of methyl isobutyl ketone and 5 g of oxalic acid. Then these components were heated to 80° C.

for uniform dissolution. Successively, 175 g of a 36 percent aqueous formaldehyde solution was added dropwise thereto over a period of 1 hour while keeping the internal temperature of the above mentioned solution at 80° C. The components were then allowed to react at 90° C. for 3 hours. Successively, the water and methyl isobutyl ketone were distilled off while gradually increasing the temperature, and finally the water, methyl isobutyl ketone and the unreacted catechol were completely distilled off while keeping the solution at 180° C. under a reduced pressure of 3 mmHg for 3 hours, to obtain a polyhydric phenol resin curing agent containing a catechol/formaldehyde condensation compound.

This polyhydric phenol resin curing agent was a yellowish-red solid with 59 g/eq. of phenolic hydroxyl equivalents and a softening point of 87° C.

PREPARATION 2

Polyhydric Phenol Resin Curing Agent

In place of the 36 percent aqueous formaldehyde solution used in Preparation 1, 290 g of α,α'-dihydroxyxylene was used for a condensation reaction in the same manner as in Preparation 1, to obtain a polyhydric phenol resin curing agent containing a catechol/α,α'-dihydroxyxylene condensation compound.

This polyhydric phenol resin curing agent was a yellowish-red solid with 138 g/eq. of phenolic hydroxyl equivalents and a softening point of 81° C.

PREPARATION 3

Polyhydric Phenol Resin Curing Agent

In place of the catechol used in Preparation 1, 530 g of 2,3-dihydroxynaphthalene was used for a condensation reaction in the same manner as in Preparation 1, to obtain a polyhydric phenol resin curing agent containing a 2,3-dihydroxynaphthalene/formaldehyde condensation compound.

This polyhydric phenol resin curing agent was a reddish-brown solid with 91 g/eq. of phenolic hydroxyl equivalents and a softening point of 102° C.

PREPARATION 4

Polyhydric Phenol Resin Curing Agent

In place of the catechol used in Preparation 1, 330 g of hydroquinone was used for a condensation reaction in the same manner as in Preparation 1, to obtain a polyhydric phenol resin curing agent containing a hydroquinone/formaldehyde condensation compound.

This polyhydric phenol resin curing agent was a reddish-brown solid with 60 g/eq. of phenolic hydroxyl equivalents and a softening point of 85° C.

EXAMPLES 1–4 AND COMPARISONS 1–4

As listed in Table 1, a commercially available epoxy resin derived from 3,3',5,5'-tetramethyl-4,4'biphenol, a commercially available epoxy resin consisting of a mixture of an epoxy resin derived from 4,4'-biphenol and an epoxy resin derived from 3,3',5,5'-tetramethyl-4,4'-biphenol, or an o-cresol novolak-type epoxy resin was used as the epoxy resin. Each of the polyhydric phenol resin compositions obtained in Preparations 1–4 above, diaminodiphenyl-methane, or a commercially available phenol novolak resin was used as the curing agent. In all cases except for Comparison 2, triphenylphosphine was included in each of the epoxy resin compositions as a curing accelerator.

First, the epoxy resin and the curing agent were melted at a temperature of 100°–120° C. for 5 minutes while mixing together. The curing accelerator was added rapidly and mixed into the resin/curing agent mixture. Then the mixture was poured into a metal mold and allowed to cure at 180° C. for 8 hours.

The cured product was cut to obtain samples for the measurement of flexural strength and samples for the measurement of thermal stability. The results of the flexural strength and thermal stability tests with these samples at high temperature are shown in Table 1. Each of the molding materials in Examples 1–4 produced cured products with excellent flexural strength and thermal stability at high temperatures in comparison with the molding materials in Comparisons 1–4. Thus the composition of the invention are more suitable as molding materials to be used at high temperatures.

TABLE 1

| | Composition (parts by weight) | | Content of curing accelerator (triphenyl-phosphine) | Properties of cured product | |
|---|---|---|---|---|---|
| | Epoxy resin comp.[1] | Curing agent and content | | Flexural strength 200° C. (kg/cm$^2$) | Thermal stability[3] (°C.) |
| Ex. 1 | A 100 | Prep. 1 32 | 1 | 3.2 | 405 |
| Ex. 2 | B 100 | Prep. 1 34 | 1 | 3.6 | 403 |
| Ex. 3 | A 100 | Prep. 2 74 | 1 | 3.0 | 390 |
| Ex. 4 | A 100 | Prep. 3 49 | 1 | 3.1 | 403 |
| Comp. 1 | C 100 | Prep. 1 28 | 1 | 0.3 | 399 |
| Comp. 2 | A 100 | Diamino diphenyl methane 27 | 0 | 3.0 | 375 |
| Comp. 3 | A 100 | Phenol novolak resin[2] 55 | 1 | 0.2 | 396 |
| Comp. 4 | A 100 | Prep. 4 32 | 1 | 0.5 | 405 |

Footnotes for Table 1:
[1]A: Epoxy resin derived from 3,3',5,5'-tetramethyl-4,4'-biphenol (EPIKOTE YX4000, trade name of Yuka Shell Epoxy Co.; Epoxy eq. 186)
B: Mixture of an epoxy resin derived from 4,4'-biphenol and an epoxy resin derived from 3,3',5,5'-tetramethyl-4,4'biphenol (EPIKOTE YL6121, trade name of Yuka Shell Epoxy Co., Epoxy eq. 172)
C: o-cresol novolak-type epoxy resin (EPIKOTE 180S65, trade name of Yuka Shell Epoxy Col.; Epoxy eq. 210)
[2]Phenol novolak resin, product of Gun-ei Kagaku Co., Hydroxy eq. 103, softening point 85° C.
[3]Determined 5 percent weight loss temperature using a thermobalance

We claim:
1. A curable epoxy resin composition comprising:
   (a) a biphenol epoxy resin represented by the following formula (I):

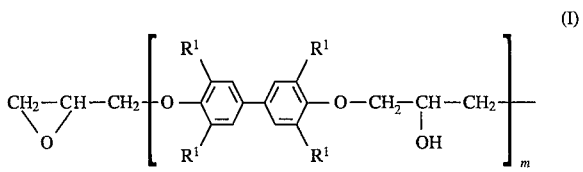

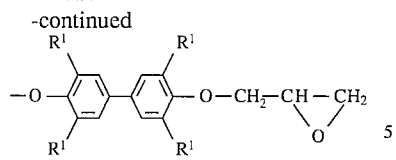

wherein $R^1$ is independently a hydrogen atom, a halogen atom, an alkyl group of 1–10 carbon atoms, a substituted or unsubstituted phenyl group, a substituted or unsubstituted aralkyl group or an alkoxy group, and m is a number with an average value of 0–5; and (b) a polyhydric phenol resin curing agent provided by oligomerizing a polyhydric phenol compound having 2 or more phenolic hydroxyl groups attached at adjacent positions on the aromatic ring.

2. The curable epoxy resin composition of claim 1 wherein the polyhydric phenol resin curing agent is a compound represented by the following formula (II):

wherein A independently is a monovalent or divalent residual group derived from a polyhydric phenol compound represented by the following formula (III), (IV), or (VI):

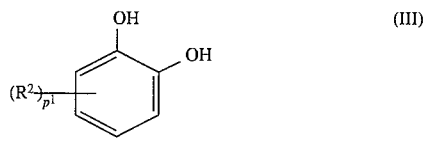

wherein $R^2$ independently is an alkyl group of 1–10 carbon atoms, a substituted or unsubstituted phenyl group, a substituted or unsubstituted aralkyl group, an alkoxy group, a hydroxy group or a halogen atom, and $p^1$ is an integer of 0–2;

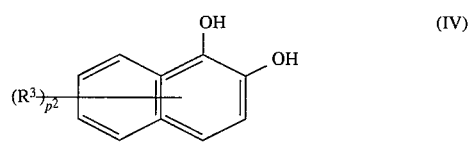

wherein $R^3$ independently is an alkyl group of 1–10 carbon atoms, a substituted or unsubstituted phenyl group, a substituted or unsubstituted aralkyl group, an alkoxy group, a hydroxyl group or a halogen atom, and $p^2$ is an integer of 0–4; or

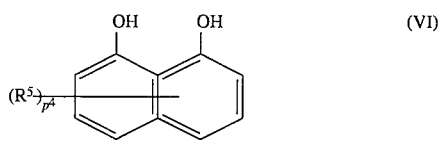

wherein $R^5$ independently is an alkyl group of 1–10 carbon atoms, a substituted or unsubstituted phenyl group, a substituted or unsubstituted aralkyl group, an alkoxy group, a hydroxyl group or a halogen atom, and $p^4$ is an integer of 0–4;

Y independently is a divalent residual group represented by the following general formula (VII), (VIII), (IX), or (X):

wherein $R^6$ independently is a hydrogen atom, an alkyl group of 1–10 carbon atoms, a substituted or unsubstituted phenyl group, a substituted or unsubstituted aralkyl group, an alkoxy group, a hydroxyl group or a halogen atom;

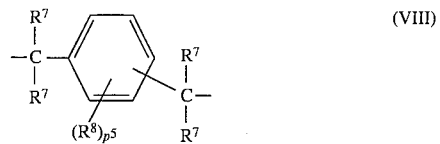

wherein $R^7$ and $R^8$ are each independently a hydrogen atom, an alkyl group of 1–10 carbon atoms, a substituted or unsubstituted phenyl group, a substituted or unsubstituted aralkyl group, an alkoxy group, a hydroxyl group or a halogen atom, and $p^5$ is an integer of 0–4;

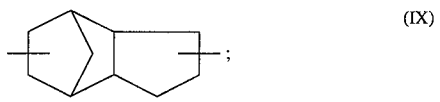

or

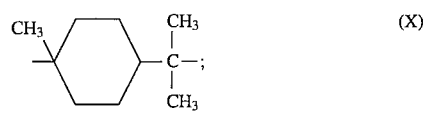

and n is a number with an average value of 0–10.

3. The curable epoxy resin composition of claim 1 wherein the polyhydric phenol compound is selected from the group consisting of catechol, methylcatechol, dimethylcatechol, butylcatechol, phenylcatechol, methoxycatechol, pyrogallol, hydroxyhydroquinone, tetrahydroxybenzene, bromocatechol, 1,2-dihydroxy-naphthalene, methyl -1,2-dihydroxynaphthalene, dimethyl-1,2-dihydroxynaphthalene, butyl-1,2-dihydroxynaphthalene, methoxy-1,2-dihydroxynaphthalene, hydroxy-1, 2-dihydroxynaphthalene, dihydroxy-1,2-dihydroxynaphthalene, bromo-1,2-dihydroxynaphthalene, 2,3-dihydroxynaphthalene, methyl -2,3-dihydroxynaphthalene, dimethyl -2,3-dihydroxynaphthalene, butyl -2,3-dihydroxynaphthalene, methoxy-2, 3-dihydroxynaphthalene, hydroxy-2,3-dihydroxynaphthalene, dihydroxy-2,3-dihydroxynaphthalene, bromo-2,3-dihydroxy-naphthalene, 1,8-dihydroxynaphthalene, methyl-1,8-dihydroxynaphthalene, dimethyl-1,8-dihydroxynaphthalene, butyl-1,8-dihydroxynaphthalene, methoxy-1,8-dihydroxynaphthalene, hydroxy-1,8-dihydroxynaphthalene, dihydroxy-1,8-dihydroxy, and bromo-1,8-dihydroxynaphthalene.

4. The curable epoxy resin composition of claim 1 having a cured flexural strength at 200° C. of at least 3.0 kg/cm².

5. A cured composition of claim 4 having a flexural strength at 200° C. of at least 3.0 kg/cm² and a thermal stability of at least 390° C.

6. The curable epoxy resin composition of claim 1 wherein the polyhydric phenol resin curing agent is produced by reacting a polyhydric phenol compound having 2 or more phenolic hydroxyl groups attached at adjacent positions on the aromatic ring with a compound having a carbonyl group, a compound having an unsaturated bond, or an α-hydroxyalkylbenzene or α-alkoxyalkylbenzene.

7. The curable epoxy resin composition of claim 6 wherein the polyhydric phenol compound is selected from the group consisting of catechol, methylcatechol, dimethylcatechol, butylcatechol, phenylcatechol, methoxycatechol, pyrogallol, hydroxyhydroquinone, tetrahydroxybenzene, bromocatechol, 1,2-dihydroxy-naphthalene, methyl-1,2-dihydroxynaphthalene, dimethyl-1,2dihydroxynaphthalene, butyl-1,2-dihydroxynaphthalene, methoxy-1,2-dihydroxynaphthalene, hydroxy-1,2-dihydroxy-naphthalene, dihydroxy-1,2-dihydroxynaphthalene, bromo-1,2-dihydroxynaphthalene, 2,3-dihydroxynaphthalene, methyl-2,3-dihydroxynaphthalene, dimethyl-2,3-dihydroxynaphthalene, butyl-2,3-dihydroxynaphthalene, methoxy-2,3-dihydroxynaphthalene, hydroxy-2,3-dihydroxynaphthalene, dihydroxy-2,3-dihydroxynaphthalene, bromo-2,3-dihydroxynaphthalene, 1,8-dihydroxynaphthalene, methyl-1,8-dihydroxynaphthalene, dimethyl-1,8-dihydroxynaphthalene, butyl-1,8-dihydroxynaphthalene, methoxy-1,8-dihydroxynaphthalene, hydroxy-1,8-dihydroxynaphthalene, dihydroxy-1,8-dihydroxy, and bromo-1,8-dihydroxy-naphthalene.

8. The curable epoxy resin composition of claim 7 wherein the polyhydric phenol resin curing agent is produced by reacting the polyhydric phenol compound with compounds selected from the group consisting of formaldehyde, paraformaldehyde, acetaldehyde, benzaldehyde, hydroxybenzaldehyde, glyoxal, terephthalaldehyde, acetone, cyclohexanone, acetophenone, divinylbenzene, diisopropenylbenzene, diisopropenylnaphthalene, dicyclopentadiene, norbornene, terpene, crotonaldehyde, isopropenylacetophenone, α,α'-dihydroxyxylene, α,α'-dimethyoxyxylene, dihydroxymethylphenol, trihydroxymethylbenzene, trihydroxymethylphenol, dihydroxymethylcresol, and tetrahydroxymethylbisphenol A.

9. The curable epoxy resin composition of claim 8 wherein the polyhydric phenol compound is selected from the group consisting of catechol, methylcatechol, dimethylcatechol, butylcatechol, phenylcatechol, methoxycatechol, pyrogallol, hydroxyhydroquinone, tetrahydroxybenzene, and bromocatechol.

10. The curable epoxy resin composition of claim 9 wherein the polyhydric phenol resin curing agent is produced by reacting catechol and formaldehyde or α,α'-dihydroxyxylene.

11. The curable epoxy resin composition of claim 7 wherein the biphenol epoxy resin is produced from a biphenol selected from the group consisting of 4,4'-biphenol, 3,3'-dimethyl-4,4'-biphenol, 3,5'-dimethyl-4,4'-biphenol, 3,3'-dibutyl-4,4'-biphenol, 3,5-dibutyl -4,4'-biphenol, 3,3'-diphenyl-4,4'-biphenol, 3,3'-dibromo-4,4'-biphenol, 3,3',5,5'-tetramethyl-4,4'-biphenol, 3,3'-dimethyl-5,5'-dibutyl-4,4'-biphenol, 3,3',5,5'-tetrabutyl-4,4'-biphenol, and 3,3',5,5'-tetrabromo-4,4'-biphenol.

12. The cured composition of claim 1.
13. The cured composition of claim 7.
14. The cured composition of claim 9.

* * * * *